United States Patent [19]
Wincewicz et al.

[11] Patent Number: 5,937,816
[45] Date of Patent: Aug. 17, 1999

[54] COMBINATION CARBURETOR BACKING PLATE AND CRANKCASE BREATHER

[76] Inventors: John Garfield Wincewicz, 3317A Windolph La., N.W., Olympia, Wash. 09502; David George Skagen, E. 1160 Agate Rd., Whelton, Wash. 98584

[21] Appl. No.: 09/122,822

[22] Filed: Jul. 27, 1998

[51] Int. Cl.$^6$ ........................................................ F02F 7/00
[52] U.S. Cl. .................................. 123/195 A; 123/41.86; 123/65 VD
[58] Field of Search ............................. 123/195 A, 41.86, 123/65 VD

[56] References Cited

U.S. PATENT DOCUMENTS

| | | |
|---|---|---|
| 2,191,940 | 2/1940 | Meckyl . |
| 3,073,293 | 1/1963 | Barker . |
| 3,242,915 | 3/1966 | Blacker . |
| 3,381,673 | 5/1968 | Drysdale . |
| 3,677,240 | 7/1972 | Sarto ..................................... 123/41.86 |
| 4,011,846 | 3/1977 | Gagliardi . |
| 4,066,055 | 1/1978 | Hager .................................... 123/41.86 |
| 4,920,930 | 5/1990 | Sakano et al. ....................... 123/41.86 |
| 5,233,967 | 8/1993 | Peller ...................................... 123/572 |

*Primary Examiner*—Noah P. Kamen
*Assistant Examiner*—Jason Benton
*Attorney, Agent, or Firm*—Brian J. Coyne

[57] ABSTRACT

A combination carburetor backing plate and crankcase breather for a motorcycle engine having at least a pair of cylinders, a cylinder head mounted on each cylinder, and a valve for connecting each cylinder head to the crankcase for venting the same through an exit port in the cylinder head. The combination includes a plate having a first side adapted for mounting to a carburetor and to the cylinder heads, and an opposite, second side adapted for mounting an air cleaner. The plate has a centrally disposed first aperture that coaxially aligns with the carburetor throat, and second and third apertures that align with the exit ports on the cylinder heads. Hollow bolts are provided for insertion through the second and third apertures for threaded attachment to the exit ports, whereby the second and third apertures communicate with the exit ports. The combination further includes a U-shaped core having a C-shaped cross-section attached to the first side of the plate that cooperates with the plate to define a channel that extends from, and communicates with, the second aperture, and extends to, and communicates with, the third aperture. The plate has at least one discharge port adjacent the core. Blow-by gases vented from the crankcase to the exit ports flow through the hollow bolts into the core, through the discharge port and into the air cleaner for recirculation through the engine.

7 Claims, 9 Drawing Sheets

FIG. 9 ary, to a combination carburetor backing plate and crankcase breather that couples an air cleaner to the carburetor and provides a channel for conducting blow-by gases vented from the crankcase into the air cleaner.

COMBINATION CARBURETOR BACKING PLATE AND CRANKCASE BREATHER

CROSS REFERENCE TO RELATED APPLICATIONS

None.

STATEMENT REGARDING FEDERALLY APPROVED RESEARCH OR DEVELOPMENT

Not applicable.

BACKGROUND OF THE INVENTION

1. Field of the Invention

This invention relates to motorcycle engines and, more particularly, to a combination carburetor backing plate and crankcase breather that couples an air cleaner to the carburetor and provides a channel for conducting blow-by gases vented from the crankcase into the air cleaner.

2. Background Art

As internal combustion engines wear, the annular spaces between the pistons and the cylinder walls increase. Following ignition of an air-fuel mixture in each cylinder, a part of the gases formed during combustion is forced through the annular space between the piston and the cylinder into the crankcase. These "blow-by" gases, comprising both burned and unburned portions of the fuel mixture, must be vented from the crankcase to the atmosphere to prevent a dangerous buildup of pressure within the crankcase.

Crankcase venting is accomplished in the four cycle, two cylinder, motorcycle engines manufactured by Harley-Davidson, Inc., by a crankcase breather system that conducts blow-by gases from the crankcase to an air cleaner, from which the gases are recirculated back into the engine through the carburetor for burning in the engine cylinders. For each cylinder, there is provided a pair of push rods that extend from the crankcase into the cylinder head for operating the intake and exhaust valves. Each of the push rods is disposed within a hollow push rod tube that communicates with the crankcase. Upper ends of the push rod tubes communicate with a chamber in the middle rocker box of each cylinder head. On each downstroke of the piston in each cylinder, an umbrella valve attached to a center rocker spacer opens, permitting blow-by gases to pass into the middle chamber. From the middle chamber, the blow-by gases are conducted to a second, upper chamber in the rocker box, and thence, via passageways, through a pair of spaced-apart, threaded holes in a right sides of the cylinder heads—the threaded holes serving to receive hollow bolts for securing a stock plastic carburetor backing plate to the cylinder heads. In a stock version of the Harley Davidson crankcase breather system, a stock plastic carburetor backing plate is provided, together with a pair of rubber tubes to conduct the blow-by gases from the hollow bolts to the air filter element.

Prior to our invention, to improve engine performance, purchasers of such motorcycles have usually removed and discarded the stock carburetor backing plate, hollow bolts, and rubber tubes, and installed instead a substitute crankcase breather system as disclosed in U.S. Pat. No. 5,233,967 to Peller. The Peller crankcase breather system included a first tubular member having a first and a second, open-ended cylindrical fitting integrally mounted at opposite ends thereof and communicating with the tube. The fittings were secured to the cylinder heads by means of hollow bolts inserted into threaded holes formed in each cylinder head. Each threaded hole, as described above, communicated with the upper chamber of a cylinder head in the standard manner. The system further included a carburetor backing plate having one side adapted for mounting an air filter and an opposite side adapted for mounting to the cylinder heads by means of mounting brackets and mounting bolts. The system also included a tube having one end attached to a nipple portion of the first fitting and an opposite end attached to an L-shaped nipple threadably received in an opening in the backing plate for communicating with the air cleaner. Blow-by gases exiting the cylinder heads through the threaded holes and hollow bolts were conducted through the first tubular member and through the tube to the air cleaner, and thence recirculated through the engine.

Although it was an improvement over the Harley Davidson stock crankcase breather system, the Peller system had some disadvantages. The multiplicity of parts in the Peller system slowed and complicated installation and removal of the system. The mounting brackets included in the Peller system permitted the carburetor to flex and vibrate, which tended to break the carburetor-to-manifold seal. This resulted in a lean running condition and occasional engine coughing and backfire.

There remains a need, therefore, for a crankcase breather system that requires very few parts to be attached to the exterior of the cylinder heads, is fast and easy to install and remove from a motorcycle engine, and so securely couples an air cleaner to the cylinder heads and carburetor as to substantially eliminate carburetor flexure and vibration during engine operation.

SUMMARY OF THE INVENTION

According to the present invention there is provided a combination carburetor backing plate and crankcase breather for a motorcycle engine having at least a first and second cylinder, a cylinder head mounted on each cylinder, means for connecting the cylinder heads to the crankcase for venting the same through an exit port on each cylinder head, a carburetor, and an air cleaner. The combination comprises a plate having a first side adapted for mounting a carburetor thereto, and a second, opposite side adapted for mounting an air cleaner. The plate has a centrally-disposed, first aperture with a diameter substantially equal to the diameter of the throat of the carburetor, the first aperture being coaxially aligned with the throat when the carburetor is mounted to said first side. Means attached to the first side are provided for securing a carburetor to the first side. The plate has second and third apertures disposed to align and communicate with the exit ports of the first and second cylinder heads, respectively, and of appropriate size for receiving the hollow bolts. Means for securing the air cleaner to the second side of the plate are also provided.

The combination further comprises a U-shaped core having a substantially C-shaped cross-section, the core being attached to the second side of the plate in sealing engagement therewith and partially encircling the first aperture. The core extends from, and communicates with, the second aperture, and extends to, and communicates with, the third aperture. At least one discharge port is provided on the plate adjacent to the core. Thus, the core and the second side of the plate cooperate to form a channel for conducting gases vented from the crankcase for release through a discharge port and into the air cleaner.

In a preferred embodiment, the plate and core are integrally cast, preferably of aluminum. A preferred means for securing a carburetor to the first side of the plate comprises a raised, annular lip coaxially disposed about the first aperture on the first side of the plate, and a plurality of bolts inserted through holes in the annular lip for securing a carburetor to the first side with the carburetor throat in mating engagement with the lip. A preferred means for securing the air cleaner to the second side of the plate includes an annular flange on the second side coaxially circumposed about the first aperture. The flange has a circular, peripheral wall that extends away from, and is normal to, the second side. The peripheral wall of the flange has diameter larger than the diameter of the first aperture. The flange has a circular, interior wall that is tapered radially outward and in an axial direction away from the second side and from the first aperture to the relatively larger diameter peripheral wall, thereby defining a venturi air intake for the carburetor. All that is necessary to secure the backing plate to the carburetor and cylinder heads are the two hollow bolts and three screws, and a pair of rubber caps to cover the heads of the bolts, which makes for a fast, easy, almost vibration-free coupling. Three bolts inserted through holes in the backing plate extend away from the second side for securing the air filter to the backing plate.

Important objective of the present invention therefore include the following:

It is an object of the invention to provide a combination backing plate and crankcase breather that couples an air cleaner to the carburetor and cylinder heads of a two cylinder motorcycle engine and provides a channel for conducting blow-by gases vented from the crankcase to the air cleaner.

It is a further object of the invention to provide such a combination comprising a plate having a first side adapted for mounting a carburetor; a second, opposite side adapted for mounting an air cleaner; a centrally-disposed, first aperture with a diameter substantially equal to the diameter of the throat of the carburetor and coaxially aligned with the throat when the carburetor is mounted to said first side; means attached to the first side for mounting a carburetor to the first side; second and third apertures disposed to overlie the exit ports of the cylinder heads; and means attached to the second side for attaching an air cleaner; and further comprising a U-shaped core of C-shaped cross-section attached to the second side of the plate and partially encircling the first aperture, the core extending from, and communicating with, the second aperture, and extending to, and communicating with, the third aperture, and the core having at least one discharge port adjacent the second side of the plate, whereby blow-by gases vented from the crankcase are conducted into the air cleaner.

Another object of the combination is to provide a venturi air intake circumposed about the first aperture on the second side of the plate.

Still further objects are to provide such a combination that minimizes flexure and vibration of the carburetor during engine operation, has a low number of parts, and is fast and easy to mount and dismount on a motorcycle engine.

The above and other aspects and advantages of the present invention will become more apparent from the following detailed description taken in conjunction with the drawings.

BRIEF DESCRIPTION OF THE DRAWINGS

The same numerals are used to denote corresponding parts throughout the several figures.

DETAILED DESCRIPTION OF THE PREFERRED EMBODIMENT

Figure 1:
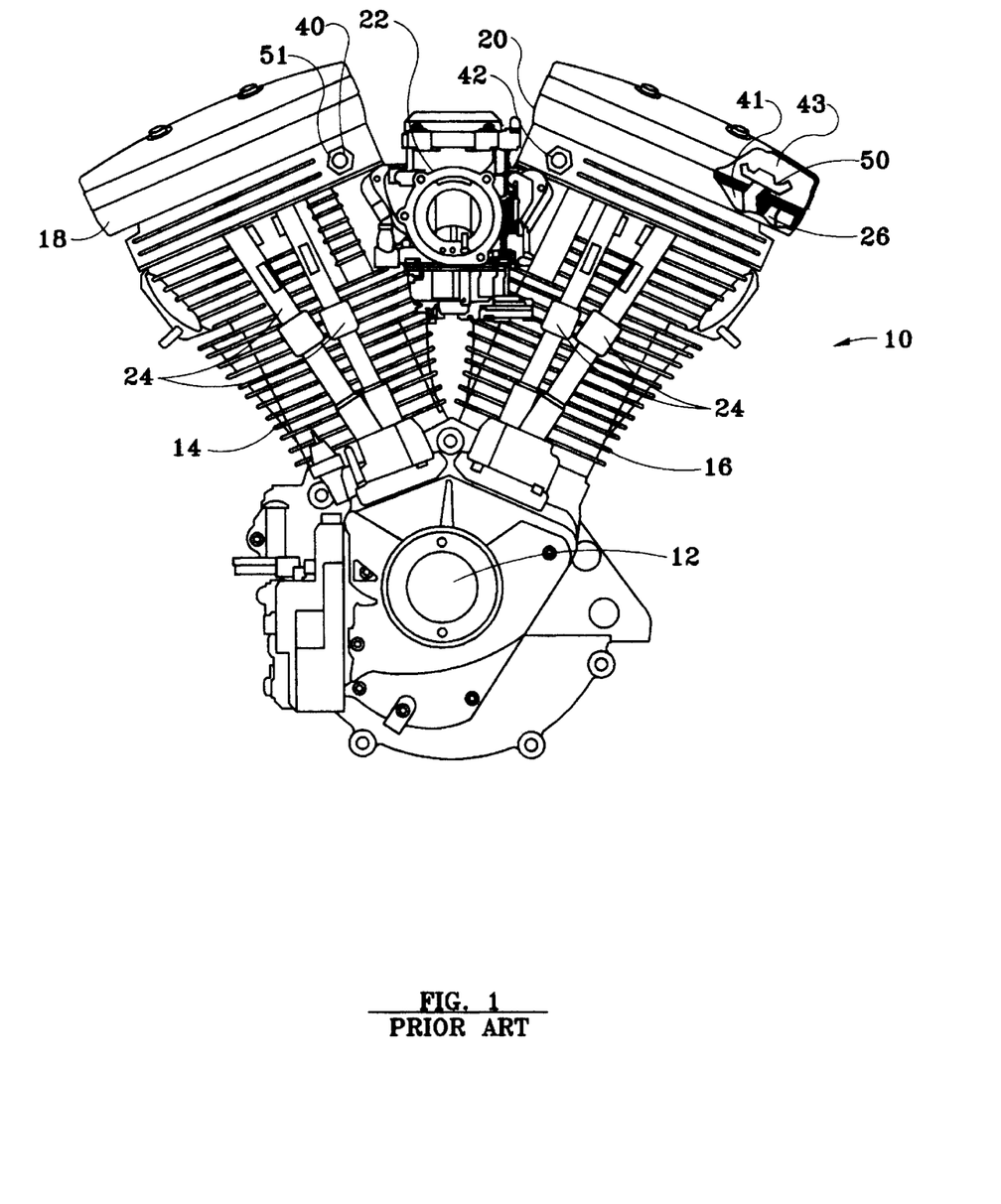
FIG. 1 is an elevational view of a right side of a two cylinder motorcycle engine with the air cleaner and carburetor backing plate removed.

FIG. 1 depicts a four cycle, two stroke motorcycle engine 10, such as those of the EVOLUTION® and SPORTSTER® series models manufactured by Harley Davidson, Inc. The engine 10 has a crankcase 12, a pair of cylinders 14, 16, and a pair of cylinder heads 18, 20 disposed at upper ends of the cylinders 14, 16. The air cleaner 30 (see FIG. 2), comprising a carburetor backing plate 32, filter element 34, and a cover 36, have been removed, thereby exposing to view the carburetor 22 mounted to the engine 10 between the cylinders 14, 16, and between the cylinder heads 18, 20. Each cylinder 14, 16 has a pair of push rod tubes 24 that extend from the crankcase 12 into the cylinder heads 18, 20. Each pair of push rod tubes 24 houses push rods (not shown) for operating cylinder intake and exhaust valves (not shown). The push rod tubes 24 are hollow and communicate at their lower ends with the crankcase 12 and at their upper ends with a first, lower chamber 41 within a middle rocker box section 26 in the cylinder heads 18, 20. An umbrella valve 50 opens on each piston downstroke in each cylinder 14, 16, thereby permitting blow-by gases to move from the lower chamber 41 to a second, upper chamber 43 in the rocker box 26 and thence, by various passageways (not shown) to a threaded hole or exit port 40, 42, on a right side of each cylinder head 18, 20, respectively. A land 51 is formed in each cylinder head 18, 20 in surrounding relation to the exit ports 40, 42.

Figure 2:
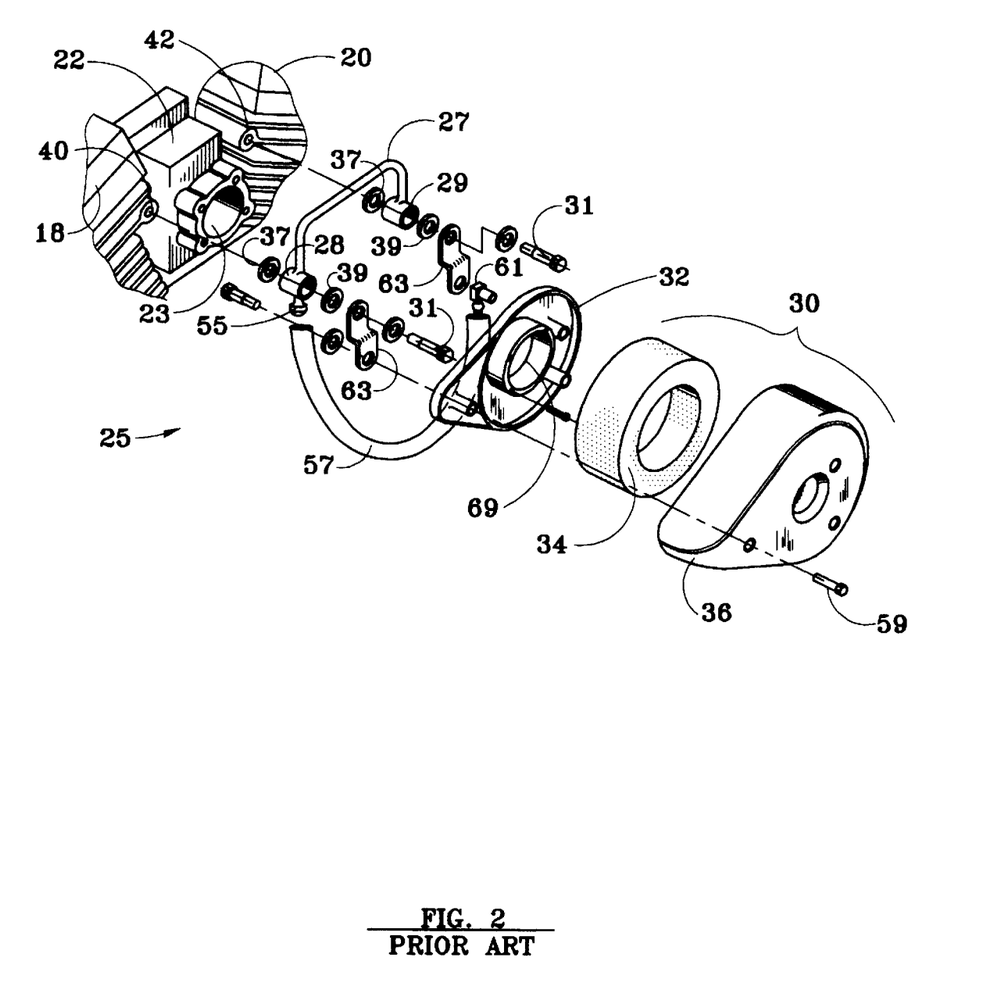
FIG. 2 is a fragmentary, perspective view of a portion of the engine illustrated in FIG. 1 together with an expanded perspective view of the Peller crankcase breather system.

FIG. 2 depicts a fragmentary view of the engine 10, showing the exit ports 40, 42 on the cylinder heads 18, 20, and the throat 23 of the carburetor 22, together with the Peller crankcase breather system, denoted generally by the numeral 25, and shown in exploded view. The Peller system 25 included a first tubular member 27 having an open-ended cylindrical fitting 28 and 29 integrally mounted respectively at each end and communicating with the interior of the tube 27. The fittings 28 and 29 were secured to the cylinder heads 18 and 20 by means of bolts 31 that threaded into the exit ports 40. The outer diameter of each bolt 31 was less than the inner diameter of fittings 28 and 29 and each had an axial bore and cross holes (not shown) to connect the axial passages of the bolts 31 to the interior of the fittings 28 and 29, respectively. A first pair of gaskets 37 on the carburetor 22 side, and a second pair of gaskets 39 on the air cleaner 30 side, of the fittings 28 and 29 were provided to seal them in cooperation with the heads of bolts 31. The gaskets 37 abutted against the lands 51. A backing plate 32 having a centrally disposed aperture 69 coupled the air cleaner 30 to the carburetor 22 by means of brackets 63 attached to the backing plate 32, and to the cylinder heads 18 and 20 by means of the hollow bolts 31. Fasteners, such as screws 59, attached the air cleaner cover 36 to the air cleaner 30 side of the backing plate 32. The fitting 28 also included a nipple 55 that communicated with the interior thereof for receiving one end of a tube 57. A second, generally L-shaped nipple 61 was threadably received in an opening (not shown) on the carburetor 22 side of the backing plate 32 for communicating with the interior of the air cleaner 30. Thus, blow-by gases passing through the exit ports 40, 42 were conducted through tube 27 and tube 57 to the air cleaner 30 for recirculation through the engine.

Figure 3:
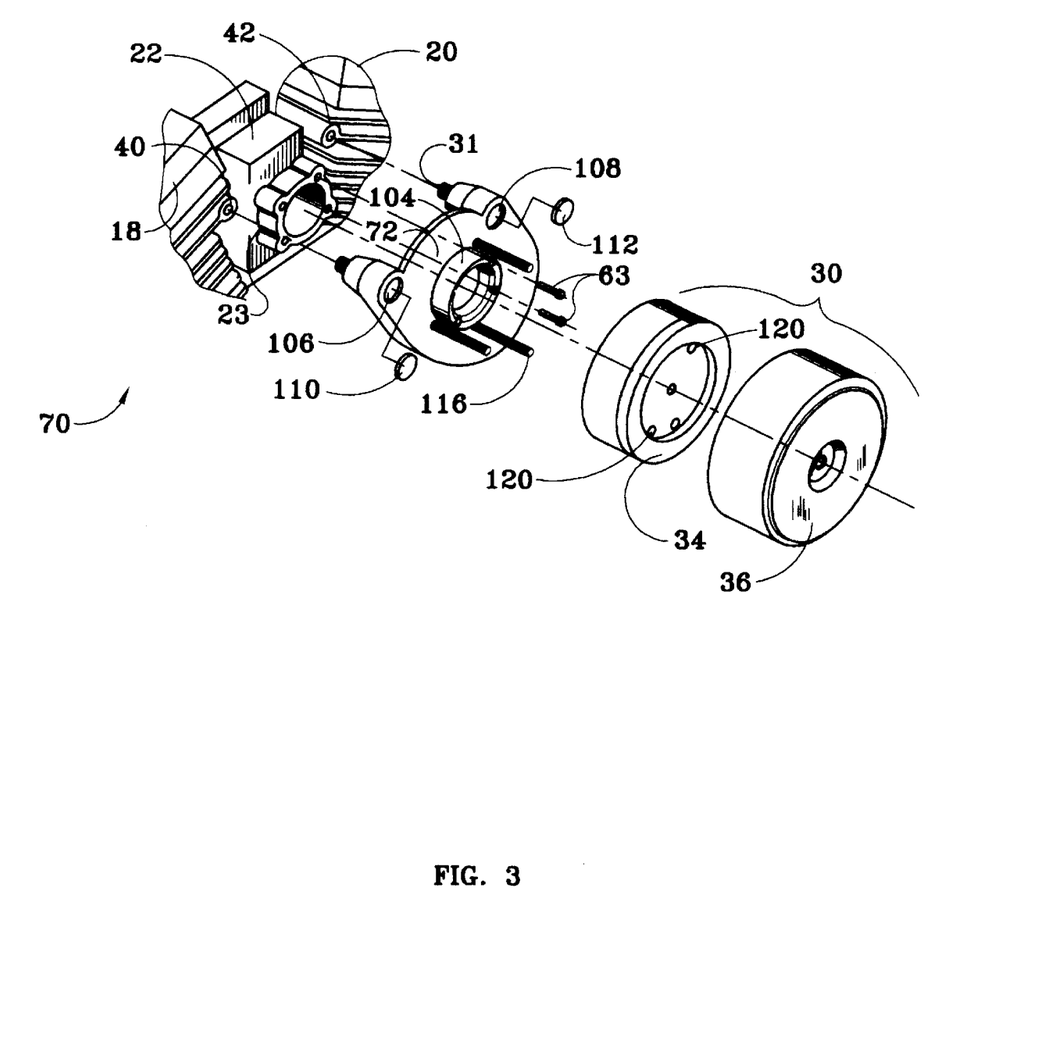
FIG. 3 is a fragmentary, perspective view of the same portion of the engine illustrated in FIG. 1 together with an expanded perspective view of the combination backing plate and crankcase breather of the present invention.
Figure 4:
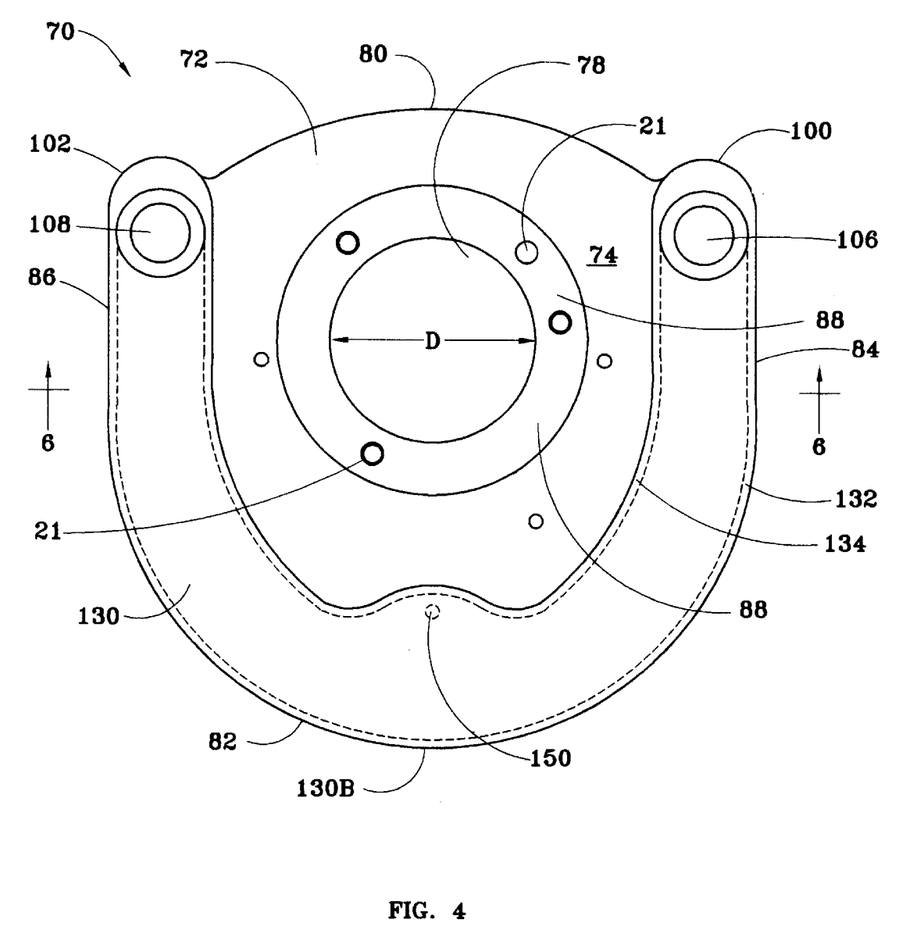
FIG. 4 is an enlarged, plan view of a first side of the plate and core of the present invention, the core being shown in phantom lines.
Figure 5:
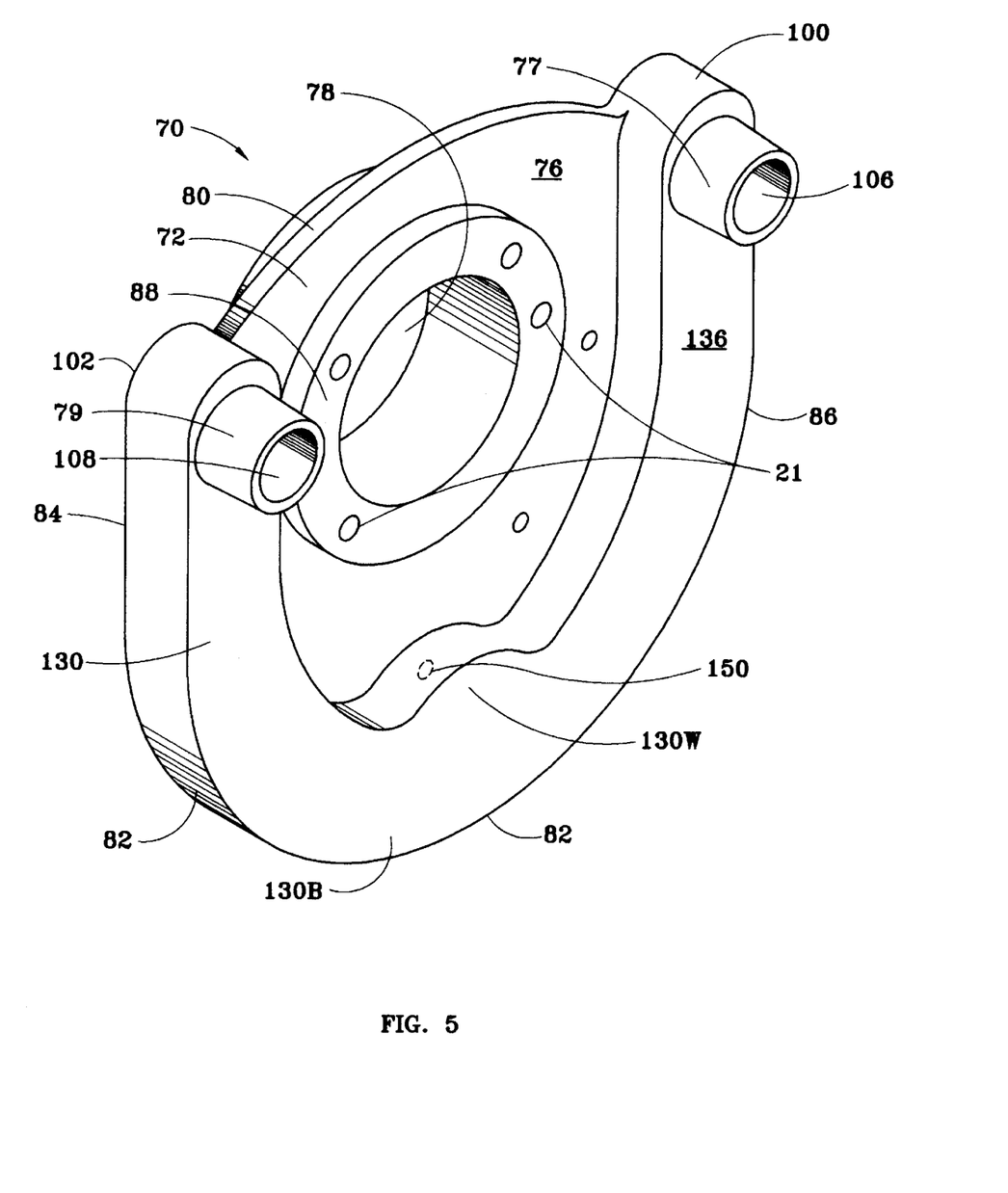
FIG. 5 is a perspective view of a second, opposite side thereof.

In the present invention, the tubes 27 and 57, fittings 28 and 29, nipples 55 and 61, and brackets 63 of the Peller system are all eliminated, and the backing plate 32 is replaced with a combination backing plate and crankcase breather in the manner described below. FIG. 3 is a fragmentary view of the engine 10 together with the combination carburetor backing plate and crankcase of the present invention, denoted generally by the numeral 70, and an air cleaner 30 comprising an filter element 34 and a cover 36, in exploded view.

Figure 9:
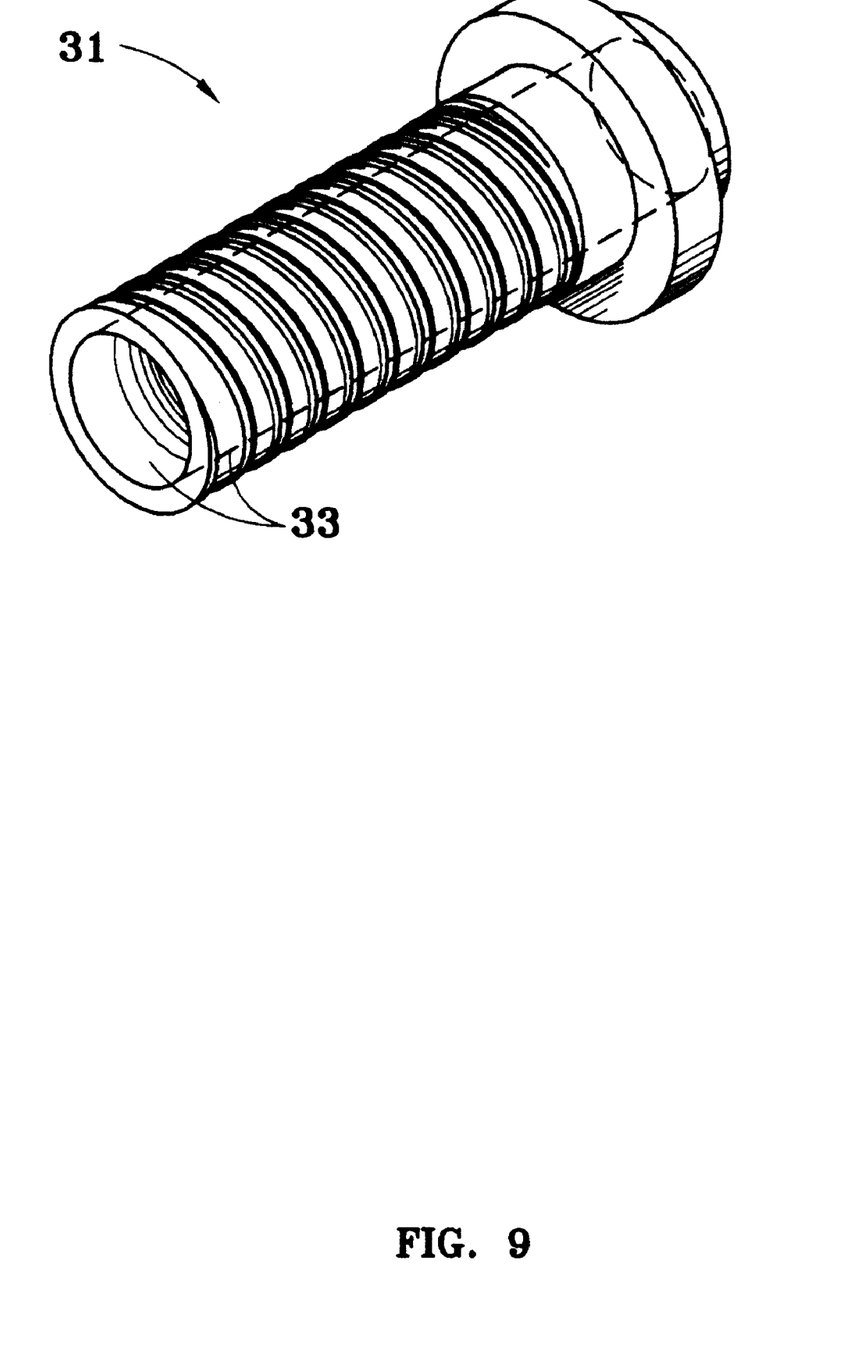
FIG. 9 is a perspective view of a hollow bolt of the invention.

Referring now to FIGS. 3–7, it may be seen that the combination 70 includes a flat plate 72 having a first side 74 adapted for mounting to a carburetor 22, and an opposite, second side 76. Preferably, the plate 72 has a convex upper edge 80 and a convex lower edge 82 joined by substantially straight left and right side edges 84, 86 having upper ends that terminate in convex, knobby extensions 100, 102. A cylindrical spacer 77, 79 disposed on the first side 74 of each of the knobby extensions 100, 102, extends away from the first side 74 and sized for mating engagement with the lands 40, 42, respectively. Centrally disposed on the plate 72 is a first aperture 78 having a diameter D substantially equal to the diameter of the carburetor throat 23 and so located on the plate 72 as to coaxially align therewith when the first side 74 of the plate 76 is mounted to the carburetor 22. The plate 72 has a second aperture 106 and a third aperture 108 in the knobby extensions 100, 102, respectively. Means attached to the first side 74 are provided for securing the carburetor 22 to the first side, and include a pair of hollow bolts 31 inserted through the first and second apertures 106, 108, which bolts 31 thread into the exit ports 40, 42. As may be seen in FIGS. 3 and 9, each of the hollow bolts 31 of the present invention has an axial bore 33 that communicates with an exit port 40, 42; unlike the hollow bolts 31 of the Peller crankcase breather system, however, the hollow bolts 31 of the present invention do not have cross holes normal to the bores 33, as they are unnecessary. Means attached to the second side 76 are provided for covering the heads of the bolts 31 and for sealing the second and third apertures 106, 108, which in a preferred embodiment are a pair of circular rubber caps 110, 112. Means attached to the first side 74 are provided for attaching the combination 70 to the carburetor 22, which in a preferred embodiment include a raised, annular lip 88 on the first side 74 coaxially circumposed about the first aperture 78 for mating engagement with the carburetor throat 23; that is, the apertures 106, 108 are disposed to overlie and communicate with the exit ports 40, 42 through the hollow bolts 31 when the carburetor throat 23 is in mating engagement with the raised lip 88.

Figure 6:
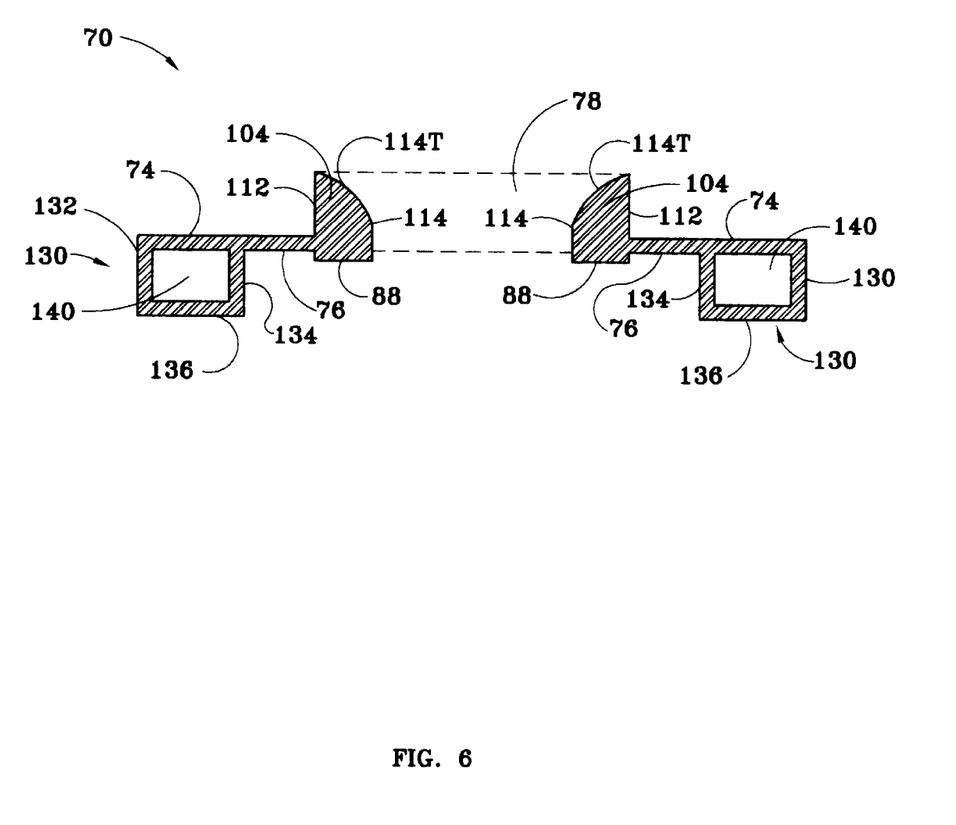
FIG. 6 is a cross-sectional view of the plate thereof taken along lines 6—6 of FIG. 4.

Means attached to the second side 76 are provided for securing an air cleaner 30 thereto, which in a preferred embodiment include an annular flange 104 coaxially circumposed about the first aperture 78 and adapted for mounting an air cleaner 30 thereon. The annular flange 104 has a circular, peripheral wall 112 that extends away from, and is normal to, the second side 76, and an interior wall 114 that is tapered radially outward from the first aperture 78 to the peripheral wall 112, thereby defining a venturi air intake for the carburetor 22. The tapered portion 114T of the interior wall 114 is preferably limited, as shown in FIG. 6, to just the distal half of the annular flange 112, the other half portion of the interior wall 114, which is nearer the plate 74, being everywhere normal to the plate 74. The means attached to the second side 76 for securing an air cleaner 30 further include a plurality of stud bolts 116 inserted through the plate 72 and through correspondingly aligned holes 120 in the cover 36. A plurality of holes 21 are provided through the annular flange 104 and annular lip 88 for screws 93 to attach the combination to the carburetor 22.

The combination 70 further includes a substantially U-shaped core, denoted generally by the numeral 130, attached to the second side 76 of the plate 72 and having a C-shaped cross-section defined by an outer side wall 132 and an inner side wall 134, normal to the plate 72, and joined by a front wall 136, as may best be seen in FIG. 6. The core 130 extends from, and communicates with, the second aperture 106, and extends to, and communicates with, the third aperture 108, thereby partially encircling the first aperture 78. The inner and outer side walls 132, 134 are substantially parallel everywhere except in a bight portion 130B of the core 130 where the inner wall 134 deviates somewhat away from the outer wall 132 and towards the first aperture 78, thereby defining a widened portion 130W of the core 130. The first side 74 of the plate 72 has at least one discharge port 150 adjacent the widened portion 130W, thereby ensuring that blow-by gases that pass through the discharge port 150 will pass into the interior of the air cleaner 30. Thus, the core 130 cooperates with the plate 72 to define a channel 140 for conducting blow-by gases vented from the crankcase 12 through exit ports 40, 42, to the discharge port 150 and into the air cleaner 30 for recirculation through the engine.

Figure 7:
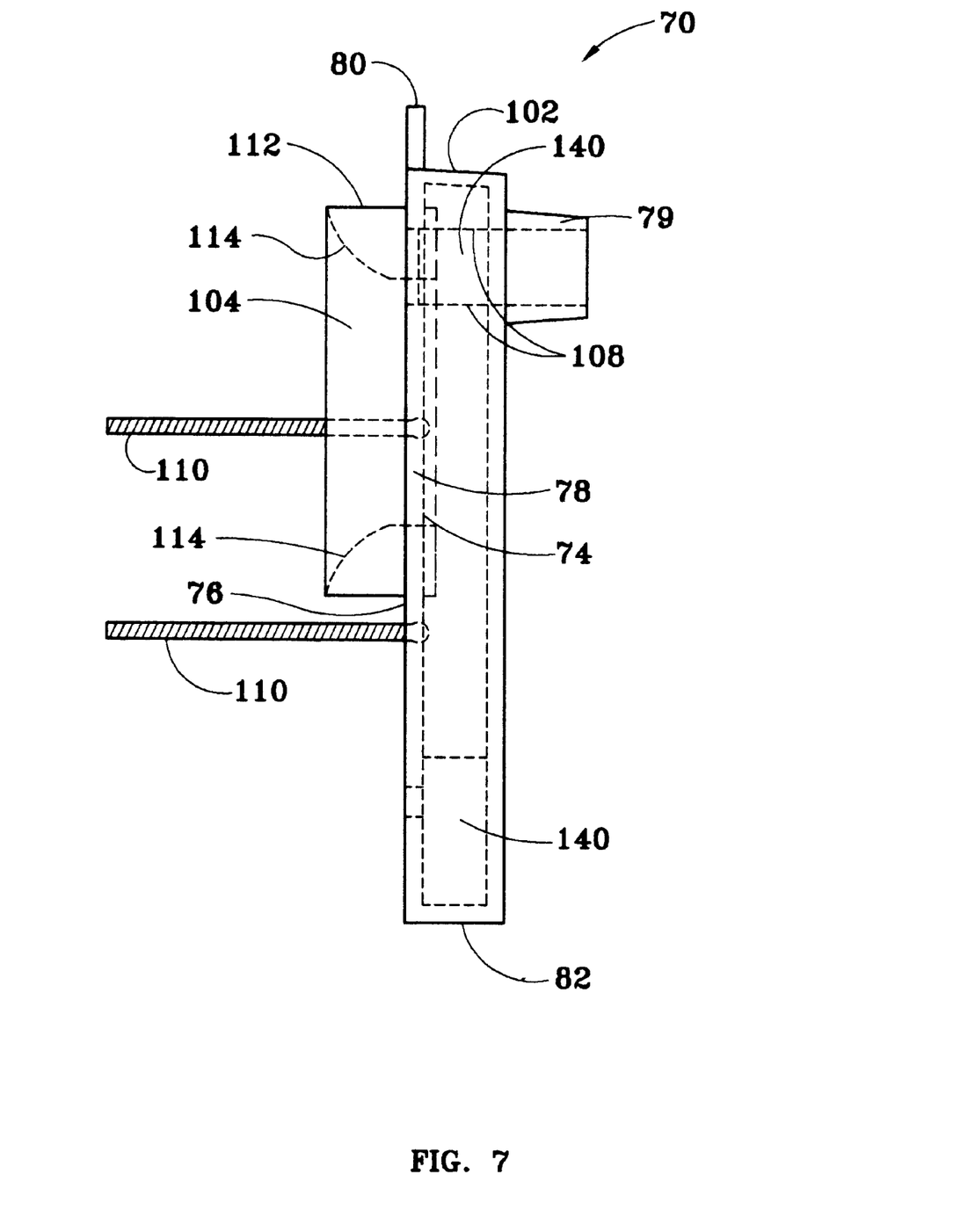
FIG. 7 is a right side view thereof.
Figure 8:
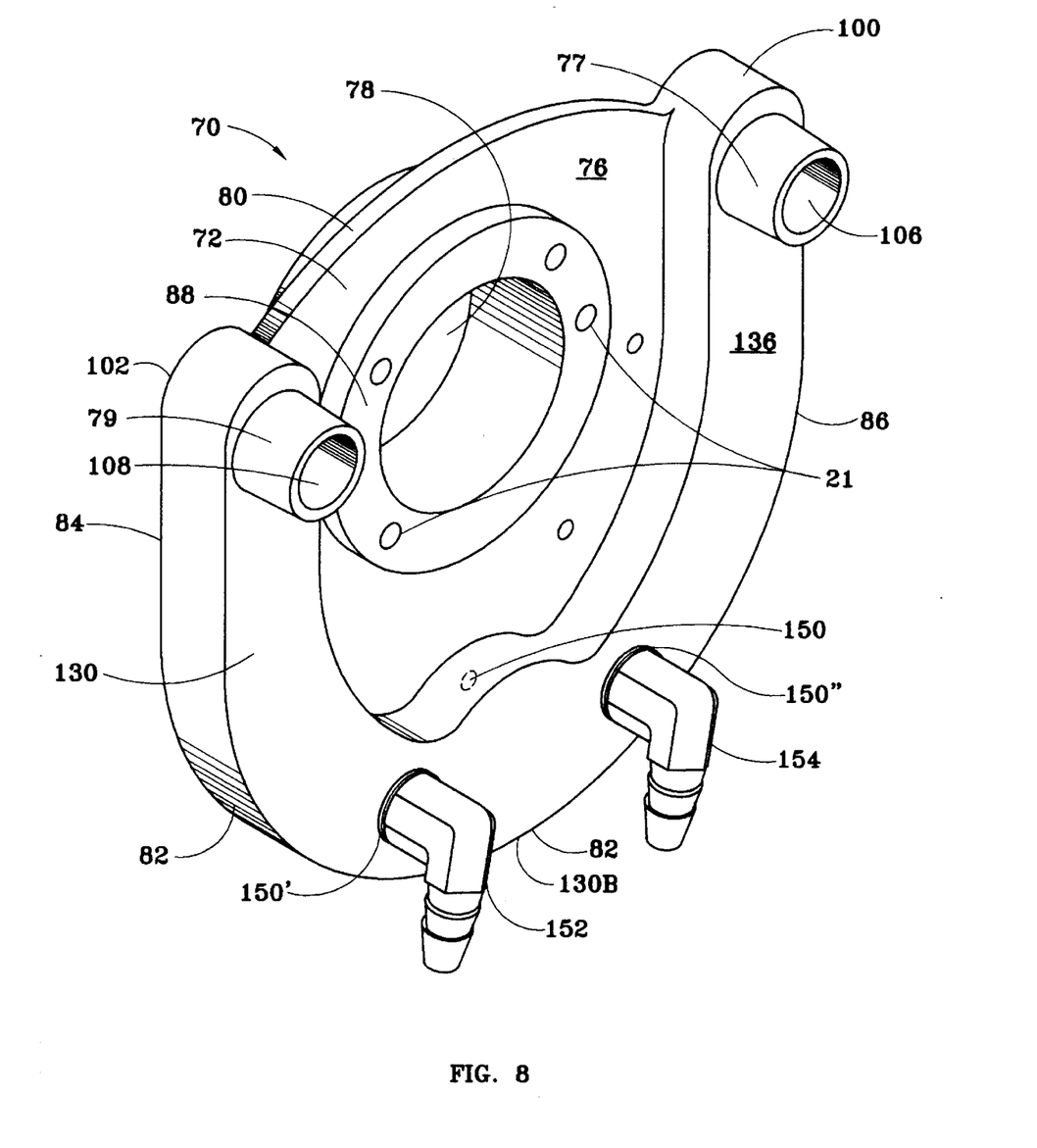
FIG. 8 is a perspective view of a second side of the plate and core of an alternative embodiment of the combination.

Provision of a single discharge port, as shown in FIG. 7, suffers, however, from two disadvantages: blow-by gases tend to foul the air filter element 34, and some of the blow-by gases being vented during the piston downstroke in one cylinder can interfere with outflow of blow-by gases from the other during its piston upstroke. Accordingly, in places where air pollution control regulations permit, it is preferable to provide instead two threaded, spaced-apart discharge ports 150', 150" on the front wall 136 of the core 130, each port 150', 150" being fitted with a threaded, discharge port spigot 152, 154 having a length of rubber or plastic tubing (not shown) attached thereto for conducting the blow-by gases directly to the atmosphere instead of into the air cleaner 30; see FIG. 8. In this embodiment of the invention, all discharge ports 150 in the plate 72 are plugged shut.

It will be appreciated that various modifications can be made to the exact form of the present invention without departing from the scope thereof. For example, the plate 72 and the core 130 are preferably integrally cast aluminum, but they need not be. It is accordingly intended that the disclosure be taken as illustrative only and not limiting in scope, and that the scope of the invention be defined by the following claims.

We claim:

1. A combination carburetor backing plate and crankcase breather for a motorcycle engine having at least a first and second cylinder, a cylinder head mounted on each cylinder, means for connecting the cylinder heads to the crankcase for venting the same through an exit port on each cylinder head, a carburetor, and an air cleaner, comprising:

a plate having a first side adapted for mounting a carburetor thereto; a second, opposite side adapted for mounting an air cleaner thereto; a centrally-disposed first aperture with a diameter substantially equal to the diameter of the throat of the carburetor, said first aperture being coaxially aligned with said throat when the carburetor is mounted to said first side; means attached to said first side for securing a carburetor to said first side; second and third, spaced-apart apertures disposed to overlie and communicate with the exit ports of said first and second cylinder heads, respectively, and means attached to said second side for securing the air cleaner thereto; and     a U-shaped core having a substantially C-shaped cross-section, said core being attached to the first side of the plate in sealing engagement therewith and partially encircling the first aperture, and said core extending from, and communicating with, the second aperture, and extending to, and communicating with, the third aperture, and said core having at least one discharge port; whereby the core and the first side of the plate cooperate to form a channel for conducting gases vented from the crankcase for release through a discharge port.

2. The combination of claim 1, wherein the means for securing a carburetor to said first side of the plate, comprises:

a raised, annular lip on the first side of the plate, coaxially disposed about said first aperture; and     a plurality of bolts attached to the plate for securing a carburetor to said first side with the throat thereof in mating engagement with said lip.

3. The combination of claim 2, wherein the means for securing the air cleaner to the second side of the plate comprises an annular flange on the second side coaxially circumposed about the first aperture and adapted for mounting an air filter element thereon, said flange having a circular, peripheral wall that extends away from, and is normal to, the second side, and an interior wall that is tapered radially outward from the first aperture to the exterior wall, thereby defining a venturi air intake for the carburetor.

4. The combination of claims 1, 2, or 3 wherein the plate, the core, the annular lip, and the annular flange are integrally cast.

5. The combination of claim 4, wherein the plate, the core, the annular lip, and the annular flange are integrally cast aluminum.

6. The combination of claim 5, wherein the core has two, spaced-apart discharge ports disposed intermediate the length of the core between the second and third apertures of the plate.

7. The combination of claim 5, further comprising:

a hollow bolt inserted through each of the second and third apertures and inserted into each of the exit ports of the cylinder heads; and     a circular rubber cap for insertion into each of the second and third apertures to cover the head of the hollow bolt inserted therethrough when the combination is mounted to the cylinder heads and the carburetor.

\* \* \* \* \*